April 19, 1932. W. D. ANTRIM 1,855,123
OVEN FOR ELECTRIC AND GAS RANGES
Filed Feb. 15, 1928  2 Sheets-Sheet 1

Inventor:
William D. Antrim
by his Attorneys
Howson & Howson

April 19, 1932.     W. D. ANTRIM     1,855,123
OVEN FOR ELECTRIC AND GAS RANGES
Filed Feb. 15, 1928    2 Sheets-Sheet 2
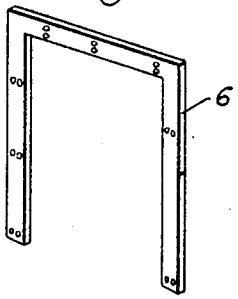
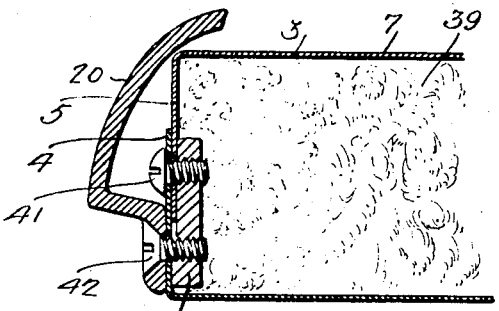
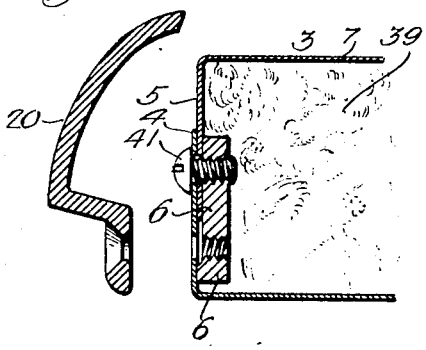
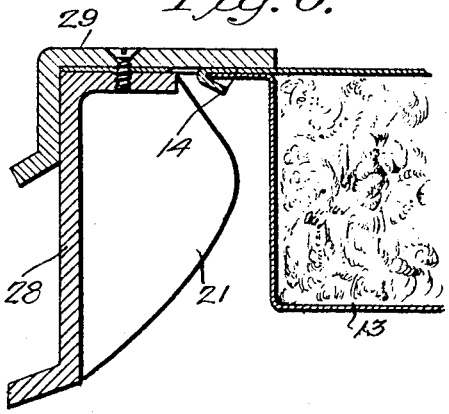
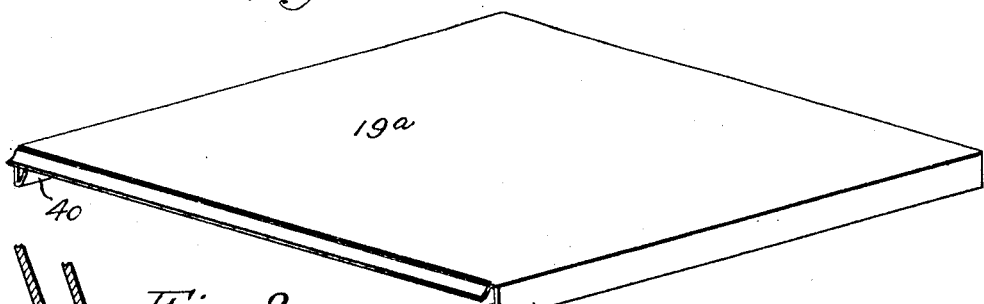
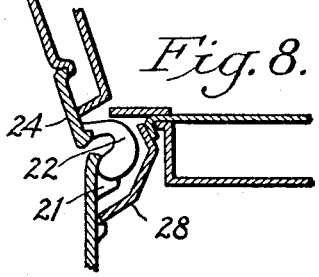
Inventor:
William D. Antrim
by his Attorneys Patented Apr. 19, 1932

1,855,123

UNITED STATES PATENT OFFICE

WILLIAM D. ANTRIM, OF GLOUCESTER, NEW JERSEY, ASSIGNOR TO ROBERTS & MANDER STOVE COMPANY, OF PHILADELPHIA, PENNSYLVANIA, A CORPORATION OF PENNSYLVANIA

OVEN FOR ELECTRIC AND GAS RANGES

Application filed February 15, 1928. Serial No. 254,515.

The object of my invention is to construct the oven of an electric or gas range in such a manner that the insulated oven body can be made as a unit, to which can be secured all other parts of the range, so that any part can be removed for replacement without dismantling the oven body.

In the accompanying drawings:

Fig. 4 is an enlarged detached view of a portion of the oven and the frame;

Fig. 5 is a view similar to Fig. 4 showing the parts assembled;

Fig. 6 is an enlarged sectional view of a portion of the oven and the door spring-box;

Fig. 7 is a detached perspective view of the top panel of the range;

Fig. 8 is a sectional view of the door hinge; and Fig. 9 is a detached perspective view of the inverted U-shaped stiffening member.

Figure 1:
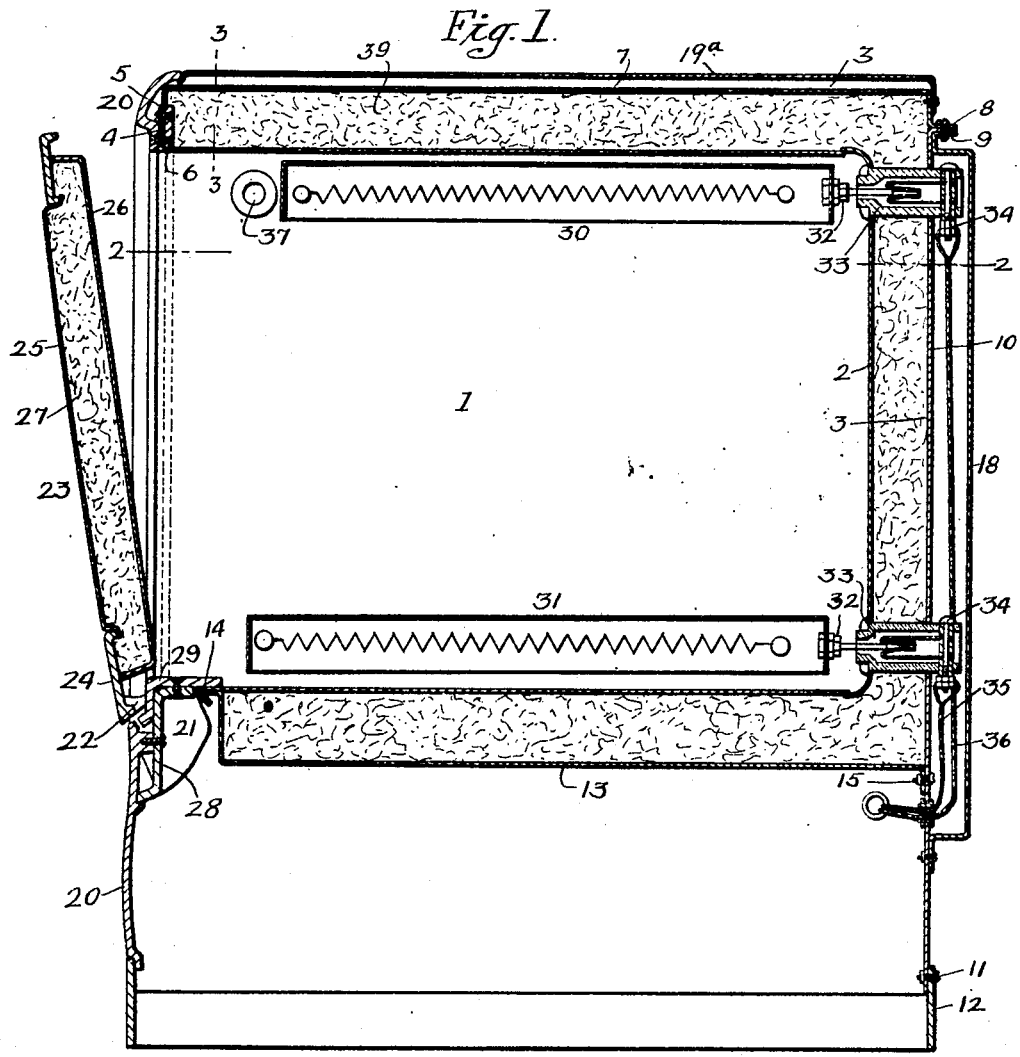
Fig. 1 is a sectional view of the oven of an electric range illustrating my invention.

Referring to the drawings, 1 is the oven unit, consisting of an inner oven casing 2 and an outer body casing 3, spaced apart and filled with suitable insulating material 39.

The front of the oven unit is open and the two casings are flanged at the outer edges as at 4 and 5 respectively, the two parts being secured by screws 41 or other fastenings to an inverted U-shaped piece 6 Fig. 9, which acts as a stiffening member for the structure and provides the means to which the main front frame is secured to the unit.

The outer body casing 3 is formed of a number of sections. The upper section 7 is flanged at the rear as at 8 and fitted to a like flange 9 on the rear portion 10 of the outer body casing, and is secured thereto by bolts in the present instance. The outer body casing extends below the oven casing at the sides and rear and is attached at 11 to the base frame part 12 of the range structure.

The bottom section 13 of the outer body casing is flanged at the forward edge and is secured to the inner oven casing by bolts. The rear edge of this section is flanged and fastened to the back section 10 by bolts 15.

Figure 2:
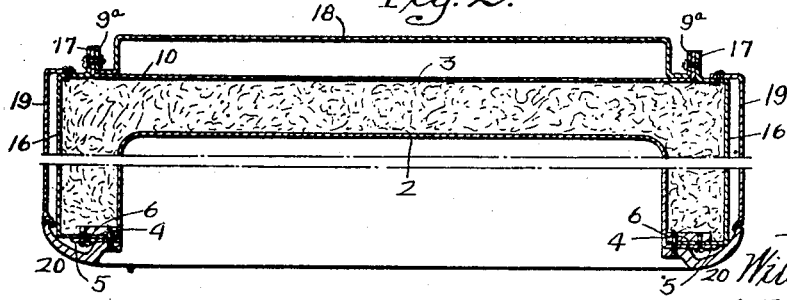
Fig. 2 is a sectional view of the range on the line 2—2, Fig. 1.

The side sections 16, Fig. 2, are flanged at the rear as at 17 and secured to similar flanges on the back section 10.

It will be seen by the above construction that the space between the inner oven casing and outer body casing can be filled with suitable insulating material and assembled as a complete unit, and can be located in and attached to the base frame of an electric or gas range. All other parts that may have to be removed are detachably secured to the oven unit. Thus renewals can be made without disturbing the oven structure.

30 and 31, in the present instance, are two electric heating elements, made in the ordinary manner and having terminals 32 which fit into sockets 33 in the rear wall of the oven body. The contact plates within these sockets are attached to the terminals 34, wires 35 and 36 being attached to these terminals, the wires leading to the switch controlling the heating elements of the oven.

The oven is provided with the ordinary thermostat (not shown) which can be introduced through the opening 37 in the side of the oven structure.

18 is an enclosing casing for the wires. This casing is flanged as shown and is secured to the back section at the flanges as clearly shown in Fig. 1 and in Fig. 2.

At each side of the oven structure, as in Fig. 2, are outer finishing or veneering panels, preferably enameled or otherwise ornamented, which are removable for replacement, when necessary.

Figure 3:
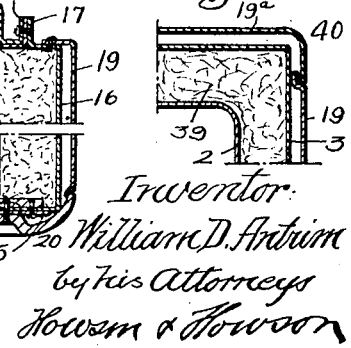
Fig. 3 is a sectional view on the line 3—3, Fig. 1.

At the top is a detachable finishing panel 19a which may be enameled or otherwise ornamented. This panel is flanged at the rear and is secured to the outer casing of the oven structure by bolts. The front end of the panel extends under the front frame 20 as shown in Fig. 1. The sides of the detachable panel 19a are flanged as at 40 and overlap the upper edges of the side panels 19, as shown in Fig. 3.

20 is a cast metal front frame which extends over the front open end of the oven structure. The frame has an opening for a door 23. This door 23 consists in the present instance of a frame portion 24, in which is a front panel 25 which may be enameled, and a rear flanged panel 26. Between these two panels is suitable insulating material 27. The door fits in the opening in front of the oven unit and against the front frame 20.

Secured to the inner side of the front frame 20 is a spring hinge box 28 which has pockets 21 for the hinges 22 and springs of the door. The front frame 20 is secured to the inverted U-shaped piece 6 by screws 42.

A flanged cap plates 29 is detachably mounted at the bottom of the oven body at its front edge and overlaps the door hinges. This cap plate also forms a finished edge for the oven unit. On removal of the cap plate, the hinger door can be removed when required.

I claim:—

1. The combination in an oven for electric or gas ranges, consisting of an inner and an outer casing and non-conducting material between the two casings, said oven being open at the front; a U-shaped stiffening member secured to the casings of the oven at the front; a front frame detachably secured to the casing of the oven and the stiffening member; a hinge box secured to the inner side of the front frame; a door having hinges located in the hinge box and arranged to close the open end of the oven; and a cap plate detachably mounted at the bottom of the oven and overlapping the door hinges.

2. The combination in an oven, of a body portion made as a unit and having an inner and an outer casing, said casing being shaped so as to close the outer end of the space between the two casings; non-conducting material located in the enclosure between the two casings; an inner stiffening member; a detachable front section; means for securing said front section to the front of the body portion of the oven; and a door mounted on the front section and arranged to close the open end of the oven body portion.

3. An oven body made as a unit to which other parts of the structure can be secured and by which they are supported, said body having a non-conductive material between the inner and outer casings, and said non-conductive material being entirely enclosed within the casings of the body portion, the said body portion having a stiffening member at the front and within the space enclosed by the inner and outer casings to which the front frame of the oven can be secured.

4. The combination in a gas or electric range, of an oven section having inner and outer casings and having non-conductive material enclosed within the casing and forming an oven structure; a detachable front frame secured to the oven structure and having a door opening therein; a door arranged to close said opening; and a detachable top section and detachable side panels secured to the oven structure and adapted to be removed from the oven structure without disturbing said oven structure.

5. The combination in an oven for electric or gas ranges, of an inner and outer casing; non-conducting material between the two casings, said oven being open at the front; a stiffening frame in the space between the inner and outer casing and at the front of the oven; a front frame secured to the outside of the oven at the front thereof; and a door hinged to the front frame and arranged to close the open end of the oven.

WILLIAM D. ANTRIM.